United States Patent [19]
Teder et al.

[11] Patent Number: 5,743,991
[45] Date of Patent: Apr. 28, 1998

[54] VACUUM-ASSISTED DEVICE FOR MOUNTING AN OPTICAL MOISTURE SENSOR ON GLASS

[75] Inventors: Rein S. Teder, Bloomington, Minn.; Dennis L. Bomer, Walbridge, Ohio; Michael A. Niver, Onalaska, Wis.

[73] Assignee: Libbey-Owens-Ford Co., Toledo, Ohio

[21] Appl. No.: 662,088

[22] Filed: Jun. 12, 1996

Related U.S. Application Data

[62] Division of Ser. No. 372,566, Jan. 13, 1995, Pat. No. 5,556,493.

[51] Int. Cl.$^6$ .................................................. B32B 31/00
[52] U.S. Cl. ........................... 156/351; 156/358; 156/367; 156/381; 156/382
[58] Field of Search ....................................... 156/285, 286, 156/351, 358, 367, 378, 381, 382

[56] References Cited

U.S. PATENT DOCUMENTS

| | | | |
|---|---|---|---|
| 4,280,861 | 7/1981 | Schwartz | 156/382 |
| 4,316,757 | 2/1982 | Walsh | 156/286 |
| 4,554,036 | 11/1985 | Newsom | 156/382 |

*Primary Examiner*—Richard Crispino
*Attorney, Agent, or Firm*—Marshall & Melhorn

[57] ABSTRACT

A device to facilitate the mounting of an optical sensor on a windshield glass using a clear adhesive tape is disclosed. The device holds the sensor, with tape exposed, in a vacuum chamber which is sealed against the glass. The chamber is evacuated, and the sensor is then pressed against the glass by the longitudinal movement of a drive shaft. The sensor may be installed with consistent force and with no trapped air pockets or air bubbles. Air pockets are a special concern because air pockets adversely effect the optical performance of the sensor. The vacuum chamber device may be controlled by a computer, and features a latching mechanism which prevents the sensor from making contact with the glass until the chamber is evacuated.

14 Claims, 2 Drawing Sheets

VACUUM-ASSISTED DEVICE FOR MOUNTING AN OPTICAL MOISTURE SENSOR ON GLASS

This application is a Division of application Ser. No. 08/372,566 filed Jan. 13, 1995 now U.S. Pat. No. 5,556,493.

BACKGROUND OF THE INVENTION

1. Field of the Invention

The present invention relates generally to a device for mounting an optical moisture sensor upon the interior surface of a windshield, and more particularly, to a mounting device which installs the optical moisture sensor in a vacuum to eliminate air pockets when tape mounting the sensor to the surface of the windshield.

2. Summary of Related Art

Motor vehicles have long been equipped with motor-driven windshield wipers for clearing moisture from the external surface of the windshield, at least within the driver's field of vision, and generally over a larger area so as to enhance vision through the windshield. In most vehicles today, the windshield wiper system includes multi-position or variable speed switches which allow the driver to select a wide, if not an infinitely variable, range of speeds to suit conditions. Wiper controls are manually operated and typically include a delay feature whereby the wipers operate intermittently at selected time delay intervals.

Wiper control systems have recently been developed which include a moisture sensor mounted on the windshield to automatically activate the motor when moisture is deposited upon the surface of the windshield or other vehicle window upon which a wiper may be employed, such as the rear window.

McCumber et al. (U.S. Pat. No. 4,620,141) disclose an automatic control circuit for triggering a sweep of the wiper blades in response to the presence of water droplets on the exterior surface of a windshield. A block-like sensor housing is mounted upon the interior surface of the windshield. The construction of the sensor and its associated circuitry are fully described in the patent, and the disclosure is incorporated herein by reference.

A number of the sensing or detecting units for automatic wiper activation operate upon the principle of a light beam being diffused or deflected from its normal path by the presence of moisture on the exterior surface of the windshield. The systems which employ optical sensors have the singular advantage that the means of sensing (i.e. disturbances in an optical path) is directly related to the phenomena observed by the driver (i.e., disturbances in the optical path that affords the driver vision).

The rain sensor systems for controlling the windshield wipers of a vehicle as disclosed by McCumber et al. and Teder (U.S. Pat. No. 5,059,877) include a box-like housing mounted upon the interior surface of the windshield. The presence of moisture on the surface of the windshield affects the reflection of light at the air-glass interface, and this change in reflected light is electronically processed and utilized as the signal for activating the windshield wipers.

In order for the system to operate properly the sensor housing must remain in a fixed position relative to the windshield surface, and the light pipes or rods must be optically coupled to the windshield so as to prevent spurious reflection of light from the interior surface of the windshield as would be caused, for example, by moisture condensation or dust accumulation on the surface. In other words, the sensor housing should securely engage the windshield and be optically coupled to the windshield so as to effectively eliminate the interface between the light pipes or rods and glass surface from an optical standpoint.

Vehicle manufacturers and windshield replacement retail outlets offer the moisture-sensing control system as an optional feature. Instead of having the moisture sensor system installed when the windshield is produced by a glass manufacturer, which would require a separate inventory for windshields with moisture sensors, the vehicle manufacturers and windshield retail outlets require a means for selectively installing the sensor system at their own facility.

Two main problems occur in connection with the selective installation of the moisture sensor system. The first problem involves the electrical interface of the moisture sensor system with existing vehicle electrical windshield wiper systems. An electrical system is disclosed in U.S. Pat. No. 5,239,244 to Teder which solves the electrical interface requirement. The control system facilitates the integration of a windshield moisture-sensitive wiper control system into an existing pulse-wipe windshield-wiper system control which utilizes the same wiring harness and is compatible with the existing system. From an electrical standpoint, the moisture sensor control system may be selectively installed on a windshield by the motor vehicle manufacturer or by the replacement windshield outlet with no adverse impact.

The second problem is mounting the sensor housing on the interior surface of the windshield to maintain the optical integrity of the moisture sensing system. U.S. Pat. No. 5,262,640 to Purvis et al. describes an intermediate adhesive interlayer for affixing the sensor housing to the windshield. The sensor housing is affixed directly to the surface of the windshield or other vehicle window by means of an intermediate interlayer disposed between the sensor housing and the interior surface of the windshield. The intermediate interlayer preferably comprises a double-faced adhesive body which adheres to both the interior surface of the window and the opposed surface of the sensor housing. The light pipes or rods of the sensor unit are optically coupled to the interlayer and the interlayer, in turn, is of such transparency as to adequately optically couple the light pipes or rods directly to the windshield or other window unit.

An additional problem area has developed in using the adhesive interlayer to secure the sensor housing. When the smooth surface of the adhesive interlayer is pressed against the flat surface of the windshield glass, air may be trapped between the adhesive layer and the glass to form an undesirable air pocket or air bubble. Pervis et al. describe optical interface regions that are less prone to the formation of air bubbles than prior art, but the techniques disclosed do not eliminate the problem entirely.

The vacuum-assisted device of the present invention provides a significant improvement in reducing the air pockets. Air bubbles in the adhesive layer are undesirable because they degrade the optical performance of the moisture sensor control system. Further, air bubbles tend to push the optical sensor away from the glass, compromising mechanical performance and prohibiting good tape contact. Finally, the inconsistent and irregular nature of air bubbles make them appear unsightly to an observer examining the outside surface of the windshield.

The problem of air bubble formation in the adhesive interlayer can be somewhat alleviated by increasing the force by which the sensor is pressed against the glass. However, the tendency of the adhesive interlayer to trap air cannot be eliminated entirely. In addition, adhesives are difficult to apply in an automotive assembly plant where the windshields are installed.

Another method for alleviating air bubble formation in the adhesive interlayer is matching the optical interface surface of the moisture sensor to the curvature of the windshield glass. However, this technique does not eliminate trapped air entirely. Matching the curvature of the sensor housing to the curvature of the windshield requires precise tolerances on the surface of the sensor housing, which would increase the cost of the device. In addition, the shape of the sensor housing would have to be designed for a single window configuration, which necessitates a different design for each windshield configuration. Consequently, it would be highly desirable to devise a means of sensor attachment which did not require great precision for mounting the sensor housing on the windshield.

In addition to air pockets, further problems may be caused by the use of excessive force in order achieve good contact of the adhesive interlayer. The moisture sensor housing must be pressed against the windshield with considerable force to ensure that the adhesive interlayer contacts over the entire surface and flows enough to accommodate imperfections. The need to apply this force leads to potential problems of fatigue and consistency in the production operations for the preparation and installation of the windshield with moisture sensor.

In addition, a force applied by hand, or with any device which may be temporarily attached to the frame of the vehicle, places an outward force on the windshield. This may damage the windshield during the installation process.

The moisture sensor control systems with optical sensors require that an interface region be optically coupled to the windshield glass. Other systems, such as described by Larson in U.S. Pat. No. 4,859,867 do not use the adhesive as an optical coupling agent and thus to not require good optical performance from the adhesive. Such systems still, however, are rendered less aesthetically pleasing by the presence of air bubbles in the adhesion of the sensor to the glass.

One means for avoiding the air bubbles and other mounting difficulties in mounting the sensor housing is to attach the moisture sensor housing to a bracket which is permanently installed on the windshield. Such a system is described by O'Farrel in U.S. Pat. No. 4,973,844. The mounting bracket is typically installed under great heat and pressure at the windshield manufacturers, in a process similar to that of installing brackets to secure rear-view mirrors. This technique, however, requires a separate inventory for windshields with brackets for securing a rain sensor. The carrying costs for the additional inventory can be significant.

SUMMARY OF THE INVENTION

In accordance with the present invention, there is provided a device for mounting the moisture sensor housing on the internal surface of a windshield. The prior art for optical sensors does not disclose or suggest a device for securing the sensor housing to the windshield glass with the use of adhesive tape. A central feature of the present invention is a chamber which permits the moisture sensor housing to be mounted under vacuum conditions in order to eliminate air bubbles.

Immediately prior to, or during the installation of the windshield into a vehicle at a vehicle assembly plant, the vacuum-assisted mounting device of the present invention may be used to secure a moisture sensor housing to the interior surface of the windshield. After the sensor housing is secured to the windshield, the installation of the windshield into a vehicle and the connection of the electrical control system may be completed.

The device of the present invention includes a vacuum chamber which defines a cavity for temporarily securing the moisture sensor. A planar holder is positioned in the cavity of the vacuum chamber for receiving and temporarily securing the moisture sensor. The sensor is inserted into the cavity through an aperture in the vacuum chamber. The vacuum chamber includes a valve for controlling the evacuation of the cavity.

To commence the installation process, the aperture of the vacuum chamber is positioned against the internal surface of the windshield. The edge of the open side includes a seal to engage the surface of the windshield. The windshield is slightly curved, but there is enough flexibility in the seal to sealably engage the surface of the windshield.

The mounting device with moisture sensor is positioned to engage the windshield in the desired location for installation of the sensor. A computer system is used to sequence and control the valve for the vacuum chamber in the mounting device of the present invention. The valve includes an output port extending into the cavity of said vacuum chamber and two input ports, a first input port connected to a vacuum source and a second input port open to atmospheric pressure. After the vacuum chamber is properly positioned against the windshield, the interior of the chamber becomes operatively connected to the vacuum source.

The air inside the chamber is evacuated by the vacuum source, and a pressure sensor imparts the information of this condition to a control computer. Once the desired vacuum is reached, the computer signals a solenoid operated latching mechanism to release a drive shaft which forces an adhesive layer on the sensor into the windshield. The pressure differential between one end of the shaft in the vacuum chamber and the external end of the shaft drives the shaft into the vacuum chamber with a force proportional to the surface area of the shaft. Within the limit of the consistency of atmospheric pressure, the force imparted to the shaft is consistent during the installation of the moisture sensor housing.

When the latching mechanism is released, the shaft presses the sensor housing mounted on the holder against the windshield glass. Because there is essentially no air in the vacuum chamber at the time the sensor housing and adhesive interlayer is pressed against the windshield, it is impossible for air bubbles to form at the optical interface. Thus the entire adhesive interlayer is free from air bubbles.

While the sensor housing is still engaging the inner surface of the windshield glass, the computer sends control signals to the sensor housing through the electrical wire harness connected to the actual sensors in the sensor housing. The computer verifies the optical integrity of the moisture sensor optical connection. Further, the computer performs a diagnostic test of sensor interface.

The computer will execute a delay routine while the shaft continues to press the sensor housing against the windshield glass. This step effectively seals the adhesive interlayer to the windshield and eliminates air bubbles. After an appropriate delay time, the computer signals the vacuum-source valve to open the release valve. Once the valve is open, the pressure chamber is open to atmospheric pressure. The device of the present invention, including the shaft and holder, may then be easily removed from the surface of the windshield.

Although this invention is primarily intended for application of a moisture sensor mounted with adhesive tape, it is contemplated that the advantages of the device would lend themselves to a moisture sensor mounted with glue or other adhesives. To use the device in such a fashion, a layer of glue would first be applied to the optical interface region of the moisture sensor housing using a squeegee. The sensor housing would then be installed as described above for the adhesive interlayer.

In addition to a computer controlled solenoid valve, the force to drive the shaft to secure the sensor housing may be provided by other mechanical means or manually by an operator installing the sensor housing on the windshield. A speed/pressure control circuit can be added to prevent the shaft from pressing the sensor housing against the glass with excessive velocity or force.

An object of the present invention is to provide a device for installing an optical moisture sensor to the inner surface of a windshield utilizing an adhesive interlayer.

Another object of the present invention is to provide a device and method for eliminating trapped air between the adhesive tape and the windshield glass, thereby improving the optical performance of the system, the appearance of the system, the ability of the tape to contact the windshield, and the mechanical integrity of the adhesive bond.

An additional object of the present invention is to provide a device and method of applying a moisture sensing housing to a windshield with a controlled force to minimize any outward force on the windshield.

A further object of the invention is to provide a device method with a controller for such that the device may be positioned at a work station on the assembly line for selective, automated installation of the moisture sensor housing. By automating the process, repeatable results are obtainable for positioning sensor housings on windshields in vehicle production operations.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
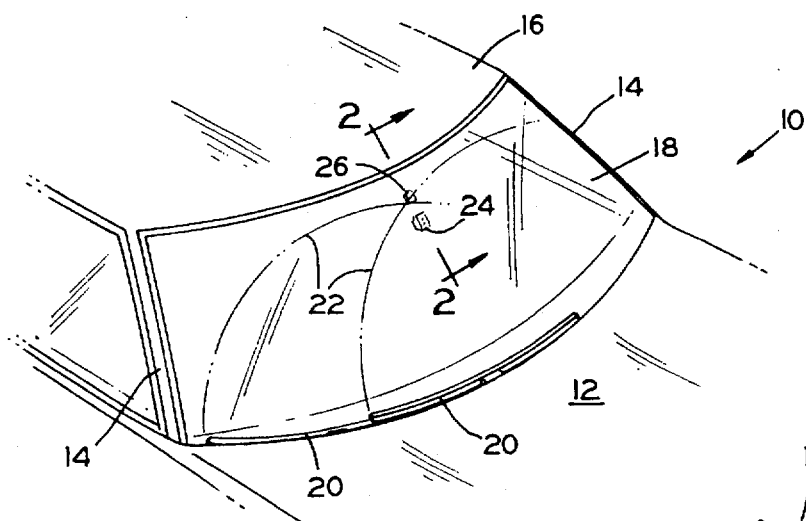
FIG. 1 is a fragmentary perspective view showing an optical moisture sensor mounted upon the windshield of an automobile.
Figure 2:
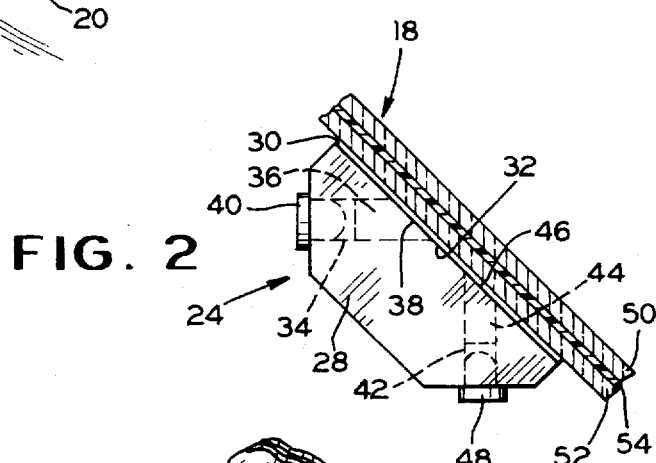
FIG. 2 is a transverse section of the optical moisture sensor showing the sensor mounted on the windshield, taken substantially along line 2—2 of FIG. 1.

Referring now to FIG. 1, there is shown generally at 10 a portion of an automobile, including a hood 12, side posts 14 and a roof 16 defining an opening within which a windshield 18 is mounted. Windshield wiper blades 20, shown in their at-rest position along the lower edges of the windshield, are operable in a conventional manner to swing in arcs 22 and sweep accumulated moisture from the surface of the windshield. There is mounted on the interior surface of the windshield within the area swept by the wipers a sensing unit, identified generally at 24, for sensing the presence of moisture on the opposite or external surface of the windshield and initiating operation of the windshield wipers. A mirror mount 26 is shown immediately above the sensing unit 24.

The rain sensor unit 24 includes a housing block 28 of an opaque material which is compatible with and will adhere to the adhesive interlayer 30. The housing block 28 may, for example, be of metal or a suitable rigid plastic material. The windshield 18 is generally relatively flat in the area where the block 28 is to be mounted, so that the optical interface surface 32 may be planar. However, it is contemplated that the surface 32 may be correspondingly contoured to match a curved windshield surface where appropriate.

A pair of spaced bores 34 extend through the block 28 at an angle preferably on the order of 45o to the base surface 32. Light pipes 36 are positioned within the bores 34, with their lower or distal ends 38 configured and positioned so as to be co-planar with the base surface 32 of the block 28. Light emitting diodes 40 are fitted into the bores 34. A second set of spaced bores 42 (four illustrated) similarly extends through the block at an appropriate angle generally about 45 to the base surface 32. Clear plastic rods or light pipes 44 are disposed within the bores 42, have lower or distal ends 46 configured and positioned so as to be co-planar with the base surface 32. Photo-transistors 48 are fitted into the bores 42 in communication with the light pipes 44.

The bores 34 and 42 are formed so that their imaginary longitudinal axis, and thus the axis of the light pipes 36 and 44 therein, will intersect approximately at the opposite or external surface of the windshield 18 when the sensing unit 24 is mounted in operative position upon the interior surface. The light emitting diodes 40 and the phototransistors 48 are electrically connected to the control system circuitry in a conventional manner, the details of which do not form a part of the present invention.

The moisture sensing unit 24 will normally be mounted upon a vehicle windshield in accordance with the invention, and thus for descriptive purposes it is illustrated and described herein as being affixed to a conventional laminated glass windshield 18. Such windshields comprise outboard and inboard sheets of glass 50 and 52, respectively, laminated to a plastic interlayer 54. Lamination of the sheets to the interlayer effectively eliminates their opposed interior surfaces from an optical standpoint. However, it will be readily appreciated that the sensing unit may as well be affixed to a monolithic glass sheet such as conventionally employed for automotive rear windows and side windows. In any event, to operate properly the sensing unit must be optically coupled to the interior surface of the windshield 18 or other window unit.

An air gap or discontinuity between the ends of the light pipes 38, 46 and the opposed surface of the inboard sheet 52 presents major problems to the operation of the sensing unit 24. Such a gap would interfere with transmission of light through the light pipes to and from the windshield. Consequently, the block 28 must be mounted upon the windshield 18 with the ends 38 and 46 of the light pipes in direct contact with the clear adhesive interlayer 30 so as to optically couple the light pipes to the glass sheet 52.

For purposes of understanding the invention of this application, the details of the operation of the sensing unit 24 need not be set forth. It should be noted that additional details concerning the operation of the sensing unit 24 and its interface with the controller, and additional information regarding the wiper control system and interface may be obtained from U.S. Pat. Nos. 4,620,141; 5,059,877; 5,239,244; and 5,262,640. To the extent any such details may be necessary to complete the descriptions and accounts necessary for purposes of the present application, they are deemed to be incorporated by reference herein.

Figure 3:
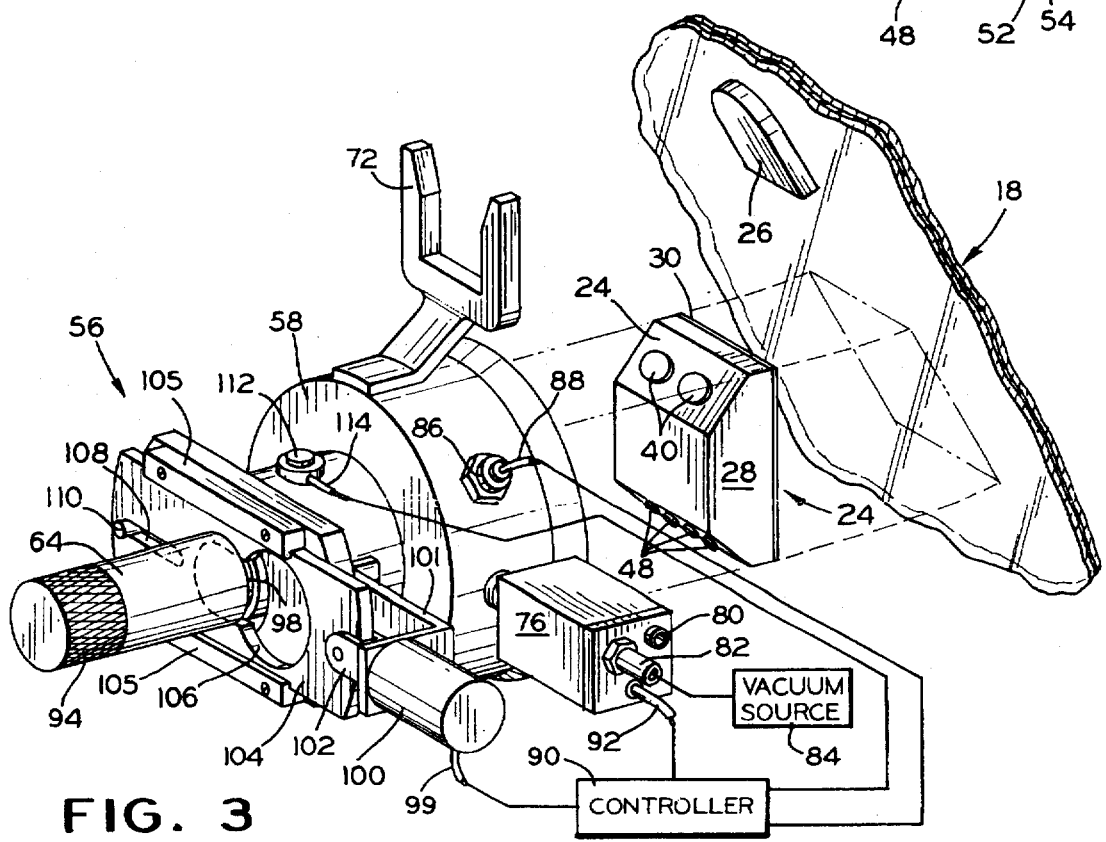
FIG. 3 is an enlarged, perspective view illustrating the device of the present invention prior to positioning the device on the surface of the windshield for installing the moisture sensor.
Figure 4:
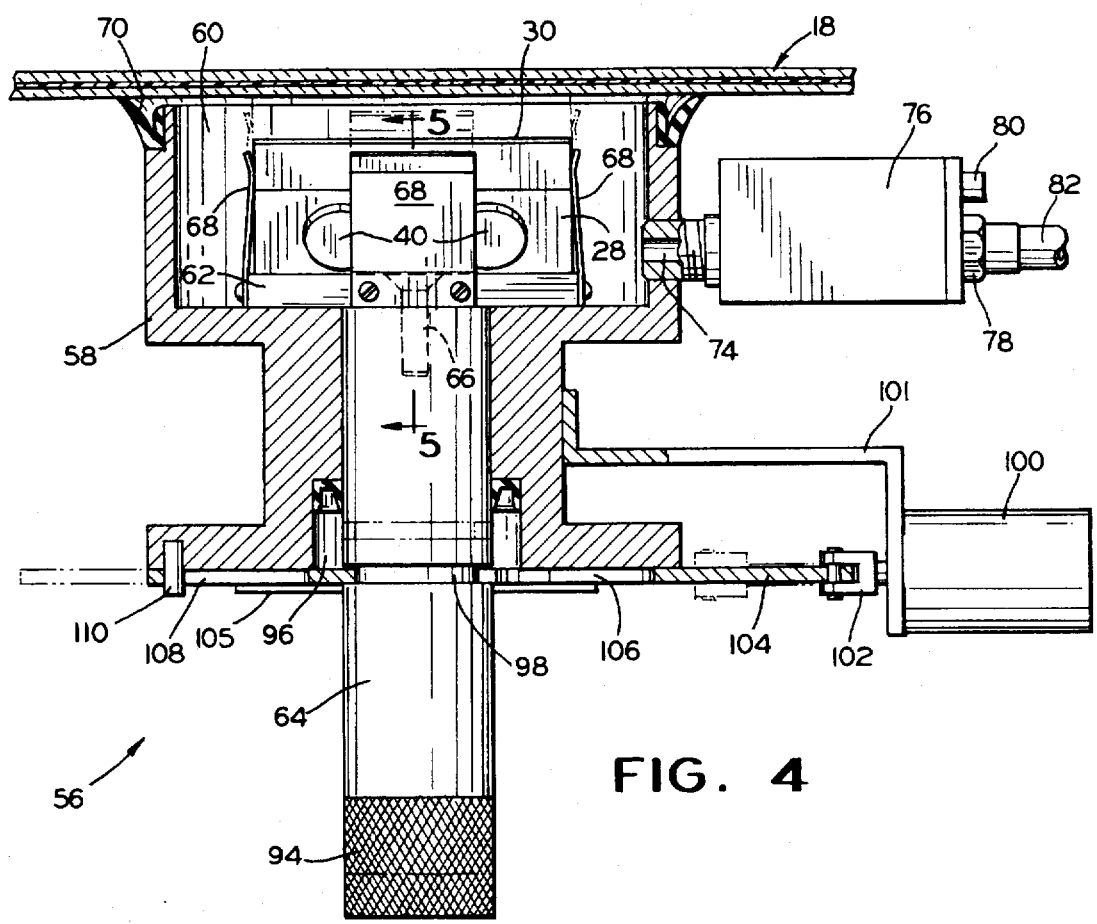
FIG. 4 is a transverse view of the device showing the device sealably engaging the surface of the windshield during installation of the optical moisture sensor.
Figure 5:
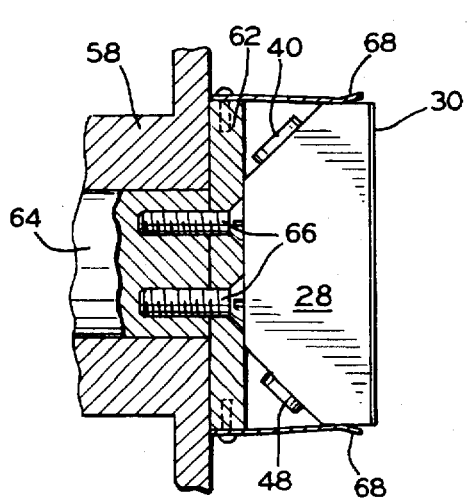
FIG. 5 is a transverse section of the holder for the moisture sensor substantially along line 5—5 of FIG. 4.

The mounting device 56 of the present invention for mounting the sensing unit 24 on the windshield 18 is shown in FIGS. 3–5. The mounting device 56 includes a vacuum chamber 58 having an aperture on one side of the vacuum chamber 58 to facilitate the insertion of the sensing unit 24 into cavity 60.

The sensing unit 24 is secured to a base 62 connected to one end of positioning shaft 64 by bolts 66. The base 62 is typically a rectangularly shaped base sized to match the size of the housing block 28 of the sensing unit 24. Spring clips 68 are mounted on the four sides of the base 62. The spring clips 68 engage the sides of the housing block 28 to temporarily secure the sensing unit 24 to the base 62. The sensing unit 24 is inserted through the aperture in the pressure chamber 58 until the block 28 engages the base 62 and is secured by the tension in the spring clips 68.

Once the sensing unit 24 is secured to the base 62 in the vacuum chamber 58, the adhesive layer 30 is prepared for engagement and the mounting device 56 is moved into position adjacent the windshield 18.

The mounting device 56 may be positioned by manually holding the mounting device 56 in the desired position on the windshield 18 or by securing the mounting device 56 on a robotic arm or other standard assembly line positioning system (not shown). Handle grips (not shown) may also be secured to the vacuum chamber 58 to facilitate holding of the mounting device 56. For manual operation, a locator arm 72 is mounted on the vacuum chamber 58. The sensing unit 24 is typically mounted just below the rear view mirror so as to minimize any obstruction of the driver's view. The locator arm 72 is a fixture designed to engage the mirror mount 26 to locate the desired position for securing the sensing unit 24.

A seal 70 is provided around the perimeter of the vacuum chamber 58 to sealingly engage the windshield 18. The seal 70 prevents pressure leakage and ensures that a vacuum is formed in the cavity 60 of vacuum chamber 58.

The vacuum chamber 58 is provided with a port 74 for connection to the output port of control valve 76. The control valve 76 has two input ports. Port 78 is connected by flexible tubing 82 to a vacuum source 84, such as a vacuum pump. Port 80 is vented to the atmosphere.

A pressure sensor 86 is mounted on the vacuum chamber 58 with a sensor to monitor the pressure in the cavity 60. The pressure sensor 86 transmits an electrical signal through lead 88 to the controller 90. The controller 90 monitors the pressure within the cavity 60 of the vacuum chamber 58 during operation of the mounting device 56. Signals from the controller 90 are transmitted through control lead 92 for operation of the control valve 76.

To install the sensing unit 24 on the windshield 18, the shaft 64 moves in a longitudinal direction which causes the adhesive interlayer 30 on the housing block 28 to sealing engage the windshield 18. FIGS. 3–4 show an embodiment which relies on the pressure differential between the cavity 60 and the external atmospheric pressure to force the shaft 64 into the cavity 60 of the vacuum chamber 58.

The shaft 64 extends through an aperture in the vacuum chamber 58 and is aligned for mounting of the sensing device 24 on the windshield 64. The external end 94 of shaft 64 may also be used to lift and position the mounting device 56. A seal 96 is provided to ensure a proper seal about the shaft aperture into the cavity 60. The shaft 64 is slidable in a longitudinal direction for moving the base 62 and the sensing unit 24. The shaft 64 includes a center recess 98, a shaft segment with a narrow diameter for use with a latching mechanism.

A latching mechanism consists primarily of a sliding latch plate 104 and solenoid 100 which are used to maintain the shaft 24 in a latched position while the vacuum is produced inside cavity 60 of the pressure chamber 58. Once the vacuum is achieved and the sensing unit 24 is ready to be secured to the windshield 18, the latch plate 104 is move to an unlatched position, and the pressure differential between the external shaft end 94 and the other end of shaft 64 inside the cavity 60 causes the shaft 64 to move in a longitudinal direction until adhesive interlayer 30 engages the windshield 18.

The latching mechanism includes a solenoid 100 mounted on bracket 101. The solenoid output shaft end coupling 102 facilitates connection of the solenoid 100 to the sliding latch plate 104. The latch plate 104 is supported by brackets 105 connected to the vacuum chamber 58. The opposite end of the latch plate 104 is provided with a slot 108 for retention of support pin 110.

The sliding latch plate 104 includes a center aperture 106 through which the shaft 64 extends. The center aperture 106 has a narrow diameter segment which fits about only the recess 98 of the shaft 64. When the latch plate 104 is positioned to one side so that the narrow diameter segment of the aperture 106 is engaged in recess 98 of the shaft 64, the latch plate 104 locks the shaft 64 in the latched position. When the solenoid 100 is energized to cause the latch plate 104 to shift laterally, the shaft 64 is positioned in a larger diameter segment of the aperture 106 and the shaft 64 is free to move in a longitudinal direction.

The solenoid 100 is controlled by the controller 90 through control lead 99. One or more control push buttons 114 may be mounted on the mounting device 56 to signal the controller 90 for starting and stopping an operational cycle of the mounting device 56.

In an vehicle assembly plant where sensing units 24 are installed on selected windshields, the mounting device 56 could be installed at a specific position in the windshield installation process. The manufacturer of the sensing units 24 will typically supply the units 24 with the adhesive interlayer 30 already applied to the housing block 28, the adhesive interlayer 30 being covered by a protective film material which is peeled away after the sensing unit 24 is mounted in the positioning device 56 and is ready for installation on a windshield 18.

The adhesive interlayer 30 is typically formed by an adhesive tape which is applied to the optical interface region of the sensing unit 24. This is accomplished using a roller or other similar installation tool to insure that no air is trapped between the tape and the optical interface of the sensing unit 24. A protective film material prevents the exposed adhesive surface from sticking to any object during shipment from the sensing unit manufacturer to the vehicle assembly plant or retail windshield point of installation.

The first step in using the mounting device 56 is to position the sensing unit 24 in the cavity 60 of the vacuum chamber 58 such that the spring clips 68 are engaging the housing block 28 of the sensing unit 24. Once the sensing unit is secured, the protective film material is removed from the adhesive interlayer 30.

The mounting device 56 is then positioned at the desired mounting position on the windshield 18 such that the seal 70 is engaging the windshield 18. The locator 72 or other positioning system or fixture may be used in positioning the mounting device 56.

Once the mounting device 56 is in position on the windshield 18, the control valve 76 is signaled by the controller 90 to connect the cavity 60 to a vacuum source 84. The pressure sensor 114 monitors the pressure to signal when a vacuum is achieved in the cavity 60. Although a total vacuum may not be achieved, the cavity 60 is sufficiently sealed such that a satisfactory vacuum level can be achieved for elimination of air bubbles when installing the sensing unit 24.

While the air is removed from the cavity 60 to form a vacuum, the shaft 64 is retained by the latching plate 104 in the latched position. Once the desired level of vacuum is achieved, the controller 90 signals the solenoid 100 to move the latch plate 104 to the unlatched position. The pressure on the external end 94 of the shaft 64 causes the shaft 64 to move in a longitudinal direction until the adhesive interlayer 30 engages the windshield 18 to secure the sensing unit 24 to the windshield 18.

Because there is no air in the cavity 60, the air bubbles which generally form between the adhesive interlayer 30 and the windshield 18 at the time of installation of the sensing unit 24 are eliminated. The elimination of air bubbles improves the performance of the sensing unit 24 to detect moisture on the windshield 18.

The controller 90 will execute a delay routine while the shaft 64 continues to press the housing block 28 and the adhesive interlayer 30 against the windshield 18. This step effectively seals the adhesive interlayer 30 to the windshield 18 and eliminates air bubbles. If the pressure differential does not provide sufficient force to bond the adhesive interlayer 30 to the windshield 18, the external end 94 of the shaft 64 may be manually pushed to create additional bonding force.

After an appropriate delay time such that the sensing unit 24 has been secured to the windshield 18, the controller 90 signals the control valve 76 to vent the cavity 60 to atmosphere through port 80. The shaft 64 is manually pulled back to the latch position and the latching plate 104 is repositioned to latch the shaft 64. The mounting device 56 is removed from the windshield and positioned for insertion of the next sensing unit 24. The adhesive force of the interlayer 30 is sufficient such that the spring clips 68 slide off the housing block 28 during removal of the mounting device 56.

After the sensing unit 24 is installed, the windshield 18 is ready for the next step in the vehicle assembly process. In addition to production use at a vehicle assembly operation, the mounting device 56 could also be used at retail outlets for replacement windshields.

Figure 6:
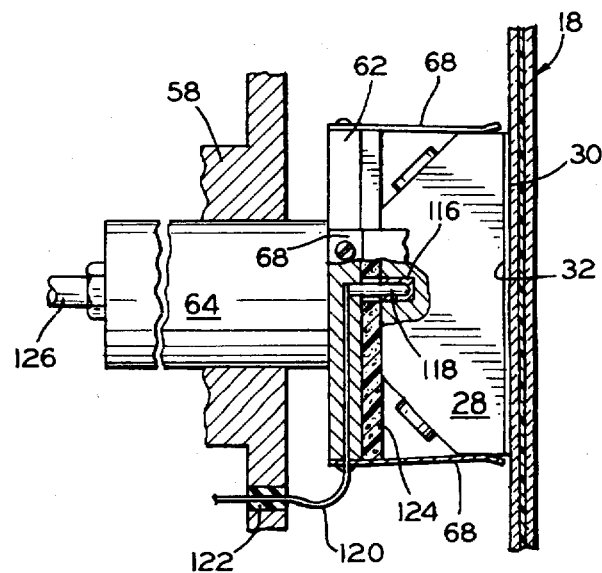
FIG. 6 is a transverse section of the holder for the moisture sensor with the addition of a drive coupling to the shaft, a padded base, and a test lead to verify the integrity of the optical connection of the sensor.

FIG. 6 shows modifications to the mounting device 56. One of the modifications which is especially desirable for use in vehicle production operations is a test circuit connected to controller 90. The connector 116 is a standard feature formed in the housing block 28 of all sensing units 24 for subsequent connection to the electrical wiper control system for controlling operation of the wipers 20. If the sensing unit 24 is defective or not properly installed, the wiper control system will not function properly. If problems with the sensing unit 24 are not discovered until later in the assembly process or during inspection, the vehicle cannot pass directly to the shipping department, but must be sent to the repair department for troubleshooting and installation of a new sensor. Such repair work adds considerable expense to the cost of manufacturing the vehicle.

In order to improve the reliability and efficiency of the sensor installation process, it is desirable to test the sensor unit 24 at time of installation. The base 62 of the mounting device 56 may include an electrical plug 118 for connection with the connector 116. A testing lead 120 connected to the plug 118 passes through the chamber at seal 122 and is connected to the controller 90. The controller can be programmed with a test circuit to test the sensing unit 24 at the time of installation. Problems are detected and remedied in a more efficient and cost effective manner.

FIG. 6 also shows the insertion of a foam pad 124 on the plate 62. In many applications, one edge of the adhesive interlayer 30 will first come in contact the windshield 18. The foam pad 124 allows the sensing unit to alter the planar orientation of the adhesive interlayer 30 until it seats properly against the windshield 18. As pressure is applied to shaft 64, a rolling type action is achieved in applying the adhesive interlayer 30 to the windshield 18, which further eliminates void formation between the interlayer 30 and the windshield 18.

The final modification concerns control of shaft 64. FIG. 6 shows a drive shaft coupling 126 formed on the external end of shaft 64 for connection to a drive unit controlled by the controller 90. The drive unit could be an electrical, pneumatic, or hydraulic system. The plate 104 and solenoid 100 may be eliminated from the mounting device 56, along with the recess 98 in shaft 64. The drive unit retains the shaft 64 in place while a vacuum is obtained in cavity 60. The controller 90 signals the drive unit to move the shaft 64 at a controlled speed until the adhesive interlayer 30 was seated properly against the windshield 18. The force driving the shaft 64 could be increased at a controlled rate until the desired pressure at the point of application is obtained.

Although the inclusion of the drive unit generally increases the cost of the mounting unit 56, the performance improvements may be significant. The speed and force of the shaft 64 can be controlled with a high degree of accuracy. In certain cases, the adhesive interlayer 30 may require an application pressure of 100 pounds per square inch or greater, which generally necessitates the use of a separate drive unit.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A sensor mounting device for mounting a sensor on a surface of a windshield, said device comprising:

a) a vacuum chamber defining a cavity for temporarily receiving a sensor, said vacuum chamber including an aperture to facilitate the insertion and removal of the sensor from the cavity of said vacuum chamber;

b) movable positioning means disposed in the cavity of said vacuum chamber for securing the sensor in the cavity such that an adhesive surface of the sensor is adjacent the aperture;

c) sealing means formed about the aperture in said vacuum chamber for sealably engaging a windshield when the aperture is positioned adjacent the windshield;

d) vacuum means connected to said vacuum chamber for selectively creating a vacuum in the cavity of said vacuum chamber when the vacuum chamber is sealably engaging the windshield; and e) means for selectively driving the positioning means while a vacuum is maintained in the cavity of the vacuum chamber such that the adhesive surface of the sensor is secured to the windshield in a vacuum.

2. The sensor mounting device defined in claim 1 including a controller in electrical communication with said vacuum means and said drive means for controlling the operation of said vacuum means and said drive means.

3. The sensor mounting device defined in claim 2 wherein said controller includes a switching means mounted on said vacuum chamber for starting and stopping said vacuum means and said drive means.

4. The sensor mounting device defined in claim 2 wherein said vacuum means includes a valve in electrical communication with said controller for controlling pressure in said vacuum chamber, said valve having an output port communicating with the cavity of said vacuum chamber and two input ports, a first input port connected to a vacuum source and a second input port open to atmospheric pressure.

5. The sensor mounting device defined in claim 2 including a pressure sensor in electrical communication with said controller and mounted on said vacuum chamber for monitoring the pressure in said cavity.

6. The sensor mounting device defined in claim 2 wherein said positioning means includes an electrical connector extending from said positioning means for electrically connecting the sensor to said controller, said controller transmitting signals to said sensor to verify optical operation of the sensor upon securing the sensor to the windshield.

7. The sensor mounting device defined in claim 1 wherein said drive means includes a shaft extending into said vacuum chamber opposite the aperture, said shaft including a first end connected to said positioning means in the cavity of said vacuum chamber and a second end extending from said vacuum chamber, whereby the shaft may be moved longitudinally to secure the sensor to the windshield and a seal mounted to sealably engage said shaft and said vacuum chamber.

8. The sensor mounting device defined in claim 6 wherein said drive means includes a latching means to lock the shaft in position while a vacuum is created in the chamber and a solenoid valve which may be selectively energized to release the latching means for longitudinally positioning said shaft.

9. The sensor mounting device defined in claim 6 wherein said drive means includes a pneumatic drive connected to the second end of said shaft for longitudinally positioning said shaft.

10. The sensor mounting device defined in claim 6 wherein said positioning means includes a base mounted on the first end of said shaft in the cavity of said vacuum chamber, the base including a plurality of spring clips for securing the sensor to the base such that the adhesive surface of the sensor is adjacent the aperture of said vacuum chamber.

11. The sensor mounting device defined in claim 6 wherein said positioning means includes a base mounted on the first end of said shaft in the cavity of said vacuum chamber, the base including a planar, compressible pad mounted on said base to facilitate alignment of the adhesive surface of the sensor with the windshield.

12. The sensor mounting device defined in claim 1 including a means, mounted on said vacuum chamber, for locating a mounting position on the interior surface of the windshield for securing the sensor.

13. The sensor mounting device defined in claim 12 wherein said means for locating a mounting position includes a fixture mounted on said vacuum chamber for engaging a mirror mount on the interior surface of the windshield.

14. A device for mounting a sensor having an adhesive surface on a surface of a windshield, said device comprising:

a) a vacuum chamber defining a cavity for temporarily receiving a sensor, said vacuum chamber including an aperture to facilitate the insertion and removal of the sensor from the cavity of said vacuum chamber;

b) drive means for pressing the sensor against the windshield, said drive means including a shaft extending through said vacuum chamber opposite the aperture, said shaft including a first end positioned in the cavity of said vacuum chamber and a second end extending from said vacuum chamber and a seal mounted to sealably engage said shaft and said vacuum chamber;

c) a base mounted transversely on the first end of said shaft in the cavity of said vacuum chamber, said base including a plurality of spring clips for securing the sensor to the base such that an adhesive surface of the sensor is adjacent the aperture of said vacuum chamber;

d) sealing means formed about the aperture in said vacuum chamber for sealably engaging a windshield when the aperture is positioned adjacent the windshield;

e) vacuum means connected to said vacuum chamber for selectively creating a vacuum in the cavity of said vacuum chamber when the vacuum chamber is sealably engaging the windshield, said vacuum means including a valve for controlling pressure in said vacuum chamber, the valve having an output port communicating with the cavity of said vacuum chamber and two input ports, a first input port connected to a vacuum source and a second input port open to atmospheric pressure; and f) control means in electrical communication with said drive means and said vacuum means for controlling the operation of said drive means and said vacuum means, said control means including a pressure sensor for monitoring the pressure in the cavity of said vacuum chamber, whereby said controller selectively controls the longitudinal movement and force of the shaft while a vacuum is maintained in the cavity of the vacuum chamber such that the adhesive surface of the sensor is secured to the windshield in a vacuum.

* * * * *